(12) United States Patent
Renaud

(10) Patent No.: US 7,388,889 B2
(45) Date of Patent: Jun. 17, 2008

(54) METHOD AND DEVICE FOR PRODUCING SUBSURFACE MARKINGS IN A TRANSPARENT MATERIAL BODY

(75) Inventor: Rémy Renaud, Hille (DE)

(73) Assignee: Vitro Laser GmbH, Minden (DE)

( * ) Notice: Subject to any disclaimer, the term of this patent is extended or adjusted under 35 U.S.C. 154(b) by 55 days.

(21) Appl. No.: 11/399,955

(22) Filed: Apr. 7, 2006

(65) Prior Publication Data

US 2006/0249490 A1 Nov. 9, 2006

(30) Foreign Application Priority Data

Apr. 27, 2005 (EP) ................... 05009208

(51) Int. Cl.
*H01S 3/11* (2006.01)
(52) U.S. Cl. .................... 372/10; 219/121.69
(58) Field of Classification Search .......... 372/75, 372/21, 6, 74, 25, 70, 10; 219/121.69; 264/400
See application file for complete search history.

(56) References Cited

U.S. PATENT DOCUMENTS

| | | | |
|---|---|---|---|
| 4,092,518 A | 5/1978 | Merard | |
| 4,467,172 A | 8/1984 | Ehrenwald et al. | |
| 5,339,323 A * | 8/1994 | Hunter et al. | ................ 372/25 |
| 5,343,483 A | 8/1994 | Farrell et al. | |
| 5,637,244 A | 6/1997 | Erokhin | |
| 6,490,299 B1 * | 12/2002 | Raevsky et al. | ............... 372/10 |
| 6,664,501 B1 * | 12/2003 | Troitski | ................. 219/121.69 |
| 6,740,846 B1 * | 5/2004 | Troitski et al. | ........ 219/121.69 |

FOREIGN PATENT DOCUMENTS

| | | |
|---|---|---|
| DE | 237 972 | 3/1910 |
| DE | 44 05 203 A1 | 8/1995 |
| DE | 199 25 801 | 12/2000 |
| DE | 199 25 801 B4 | 12/2000 |
| WO | WO 92/03297 | 3/1992 |

OTHER PUBLICATIONS

European Search Report, Jul. 7, 2006.

* cited by examiner

*Primary Examiner*—Minsun Oh Harvey
*Assistant Examiner*—Tuan N. Nguyen
(74) *Attorney, Agent, or Firm*—Collard & Roe, P.C.

(57) ABSTRACT

A method and device for producing subsurface markings in a transparent material body by focusing a pulsed laser beam in the interior of the material body so that the laser beam exceeds the destruction threshold of the material body to produce a permanent marking. Individual markings form a freely selectable internal engraving as a result of a relative movement between the laser beam and the material body. The laser pulse is varied with respect to its pulse energy (P) by means of a discharge pulse (E) that has an adjustable time delay from an excitation pulse (A). Markings that have varying optical properties depending on the pulse energy (P) are produced in this fashion.

4 Claims, 5 Drawing Sheets

METHOD AND DEVICE FOR PRODUCING SUBSURFACE MARKINGS IN A TRANSPARENT MATERIAL BODY

BACKGROUND OF THE INVENTION

1. Field of the Invention

The invention pertains to a method for producing subsurface markings in a transparent material body, wherein a pulsed laser beam is focused in the interior of the material body in such a way that the laser beam exceeds the destruction threshold of the material body at least in the respective focal point and a permanent marking is produced. Individual markings form a freely selectable internal engraving as a result of a relative movement between the laser beam and the material body.

2. The Prior Art

Methods of this type are generally known, for example, from U.S. Pat. No. 4,467,172 or German Patent No. DD 237 972 A3. U.S. Pat. No. 5,637,244 also pertains to such laser-based methods for producing an internal engraving in a material body. This material body may consist of glass such that an internal glass engraving is produced in this case. Naturally, it would also be possible to utilize plastic materials, e.g., as described in U.S. Pat. No. 4,092,518. The internal engraving may be produced in the interior of the material body one-dimensionally, two-dimensionally or even three-dimensionally. This depends on the relative movement between the laser beam and the material body.

In latter-mentioned U.S. Pat. No. 5,637,244, it was already attempted to change the optical appearance of the internal engraving composed of the individual markings by varying the size of the individual markings. This can be realized, in particular, by utilizing an optical unit for changing the focal length. Markings with a diameter in the range between 0.1 and 0.4 mm can be produced in this fashion. However, this method is associated with a significant constructive expenditure. In addition, the precision in producing the markings and the quality of their appearance leave much to be desired. The invention aims to eliminate all these disadvantages.

SUMMARY OF THE INVENTION

It is therefore an object of the invention to provide a method for producing subsurface marking, where optical variations of the individual markings, particularly with respect to their size, can be easily realized, namely in a flawlessly reproducible fashion and with realistic optical properties. It is another object of the invention to provide a suitable device for this purpose.

The invention comprises a method for producing subsurface markings in a transparent material body where the respective laser pulse is varied with respect to its pulse energy by means of a discharge pulse that has an adjustable time delay from an excitation pulse, such that markings with varying optical properties are produced depending on the pulse energy.

The excitation pulse serves—as its name implies—for realizing the population inversion of the individual laser levels that is obligatory for the actual lasing process. In this case, the pulse duration $T_P$ of the respective excitation pulse is usually adjusted in such a way that it exceeds the lifetime of an upper level of a corresponding laser transition. However, the repetition rate of the excitation pulses and their period $T_D$, respectively, are usually higher than (twice) the lifetime of the corresponding upper level such that the desired population inversion occurs.

Due to the described rules for the pulse duration $T_P$ and the period $T_D$ of the excitation pulse, the population inversion does not occur statically, but rather more or less follows the excitation pulse.

If the time delay is adjustable, the desired laser radiation is emitted from the laser resonator because the discharge pulse releases the energy stored in the laser transition, i.e., the discharge pulse causes a single laser pulse on the output side of the laser resonator and defines its duration. Optical losses in a corresponding laser resonator actually can be modulated with the respective discharge pulse. Since the discharge pulse follows the excitation pulse, the pulse energy of the emitted laser radiation ultimately depends on the adjustable time delay between the excitation pulse and the discharge pulse.

Since the pulse duration $T_P$ of the excitation pulse is shorter than the lifetime S of the upper laser level of the laser material used, i.e., since $$T_P < S$$

applies, the population inversion realized with the excitation pulse usually decreases exponentially, for example, as a result of thermal relaxations. In other words, the population of the upper laser level decreases exponentially after the falling edge of the excitation pulse. The rising edge of the population of the upper laser level, in contrast, more or less follows the rising edge of the excitation pulse.

Consequently, the energy of the laser pulse generated by means of the excitation pulse naturally also varies. The pulse energy is lowered accordingly depending on the time range of the previously described exponential decrease in the population inversion, in which the discharge pulse occurs, i.e., the adjustable time delay between the excitation pulse and the discharge pulse directly defines the pulse energy of the individual laser pulse being generated.

If it is possible to mathematically express the aforementioned decrease in the population inversion after the falling edge of the excitation pulse in dependence on the laser material, the pulse energy of the thusly generated laser monopulse on the output side can be predicted based on the time delay between the falling edge of the excitation pulse and the rising edge of the discharge pulse. However, one usually proceeds experimentally in this case, for example, in the sense of a closed control loop. This may be realized in such a way that a common control system defines the excitation pulse for realizing the population inversion in the laser material, as well as the discharge pulse and the time delay between both pulses. If the pulse energy on the output side of the laser resonator is also measured, the desired pulse energy can be defined in the sense of a closed control loop by adjusting the time delay.

The excitation pulse may optionally act upon (semiconductor) diodes that emit in the visible range. The diodes act as an optical pumping source for the actual laser material and produce the required and previously discussed population inversion between the desired laser levels. The invention actually suggests the utilization of a Q-switched, diode-pumped solid-state laser. The solid materials used may consist of Nd:YAG crystals or Nd:YLF crystals. However, this should not be understood in a restrictive sense because it would also be possible, in principle, to utilize liquid lasers or gas lasers.

The Q-switching makes it possible to change or modulate the optical quality (losses) of the laser resonator in such a way that a feedback and therefore a laser beam are only possible for short periods of time. The discharge pulse controls this Q-switch that may be realized in the form of an acousto-optical or electro-optical modulator or a generally active light switch.

It is particularly preferred to utilize a Pockels cell for the individual pulse selection.

Without the described Q-switching, the laser resonator would emit a laser pulse sequence that essentially follows the excitation pulse for realizing the population inversion in the laser material. However, the Q-switch or Pockels cell respectively makes it possible to generate laser monopulses with a pulse energy that is defined by the time delay on the output side. The duration of the corresponding discharge pulse simultaneously controls the duration of the resulting laser monopulse.

The wavelength of the laser radiation can be varied on the output side (at least within certain limits). The solid-state lasers typically utilized for this purpose (Nd:YAG) actually emit with a wavelength, for example, of 1064 nm. Output wavelengths of approximately 532 nm can be realized by doubling the frequency in a non-linear optical crystal consisting, for example, of KDP (potassium dihydrogen phosphate). If the temperature of the aforementioned frequency-doubling crystal is changed, the output wavelength of the laser radiation can also be varied (within certain limits). The corresponding temperature control is also realized by means of the control system that consequently is able to define laser monopulses with the desired energy, pulse duration and wavelength on the output side.

These laser monopulses are now used for processing the transparent material body and for producing the respective markings in its interior. In this case, each individual marking may correspond to one laser monopulse. Consequently, the varying pulse energies of individual laser monopulses can be used for producing different markings. The markings produced in the material body usually correspond to circular inhomogeneities, the radius of which respectively varies in dependence on the pulse energy emitted during their production. The circular or spherical inhomogeneities usually consist of enclosed bubbles, the radius or diameter of which respectively is a function of the pulse energy. The size of the bubbles usually increases proportionally to the pulse energy used during their production. In this respect, the pulse energy typically needs to be increased superproportionally in order to achieve an increase in the radius or diameter of the bubble. This can be explained in that the volume of the bubbles is cubically dependent on the radius.

Consequently, the optical appearance of the entire internal engraving composed of the individual permanent markings also varies. Depending on the size of a bubble, the corresponding spot appears more or less bright when the transparent material body is penetrated by or exposed to the radiation of a white light source. In this context, the term "transparent" refers to the material body usually but not exclusively appearing translucent to the human eye, i.e., it is translucent in the visible range. Naturally, the scope of the invention also includes variations, in which the respective material body is only rendered translucent with auxiliary means. An infrared camera could conceivably be utilized for this purpose. However, transparent usually means that electromagnetic radiation in the range between approximately 400 nm-800 nm, i.e., in the visible range, is able to pass without practically any losses.

However, as soon as the described markings and, as a result thereof, the internal engraving are produced in the interior of the material body, the aforementioned white light is scattered on these optical inhomogeneities. The intensity of this scattering increases proportionally to a decrease in the dimensions of the corresponding bubble. In other words, smaller bubbles appear "whiter" than larger bubbles that have a comparatively "grayer" appearance. Consequently, a gray-scale can be realized based on the sizes of the bubbles. This ultimately provides the thusly produced internal engraving with "color" such that the appearance is improved and the internal engraving imparts significantly more information than bubbles of the same size, namely because the contrast is substantially improved. This contrast can be additionally increased by defining color inclusions or colored sectors in the material body. When optical inhomogeneities are produced in these colored sectors, the brilliance of the scattering color can ultimately be adjusted with the size of the bubbles such that not only a gray-scale is realized, but also an additional color gradation in one or more colors. Such colored sectors were already described in German Patent No. DD 237 972 A3, however, not in connection with optical inhomogeneities of adjustable size.

The invention also pertains to a device for producing subsurface markings in a transparent material body. This device may be optionally utilized for carrying out the method described above. The invention also pertains to a marked material body that is provided with optically varying markings. These optically varying markings are produced by means of laser pulses with different pulse energies that can be defined with the aid of an adjustable time delay between the excitation pulse and the discharge pulse.

Consequently, the described method as well as the corresponding device has the advantage of a particularly simple design because it is no longer required to change the obligatory optical unit for focusing the laser beam. The pulse energy is, so to speak, rather variably adjusted in an electronic fashion. In this respect, it is possible to scale or define different pulse energies for each individual laser monopulse on the output side. The pulse duration as well as its wavelength can also be varied. All these adjustments are defined by a control system.

In addition, the method and the device allow for an extremely fast operation because no mechanical adjustments are carried out. This lowers the costs of a thusly manufactured material body. In addition, a functional impairment due to changes in the optical properties of the optical unit can be eliminated because the beam path does not change from laser pulse to laser pulse—namely even if the pulse energy varies.

The solid-state laser or laser as such can also be operated continuously. The output actually is controlled by the time delay between the excitation pulse and the discharge pulse only. Consequently, it is possible to reach maximum pulse energies when the time delay between the excitation pulse and the discharge pulse is zero. The pulse energy can be easily lowered from this maximum pulse energy to values that clearly lie below the destruction threshold of the material body. Due to this measure, it is not required to provide additional mechanical shutters or to take other measures for preventing unwanted markings. This additionally lowers the constructive expenditure and results in an extended service life as well as stable thermal and optical properties. These are the significant advantages of the invention.

BRIEF DESCRIPTION OF THE DRAWINGS

Other objects and features of the present invention will become apparent from the following detailed description considered in connection with the accompanying drawings.

It is to be understood, however, that the drawings are designed as an illustration only and not as a definition of the limits of the invention.

In the drawings, wherein similar reference characters denote similar elements throughout the several views:

FIG. 1 shows a schematic representation of the device according to the invention;

FIG. 2 shows details of the laser used;

FIG. 3 shows a time-dependency diagram for elucidating the individual pulse sequences;

FIG. 4 shows an inscription process for producing the internal engraving; and

FIG. 5 shows a graphic comparison of the time delay between the excitation pulse and the discharge pulse (X-axis) and the pulse energy resulting thereof (Y-axis) for two different laser materials.

DETAILED DESCRIPTION OF THE PREFERRED EMBODIMENT

Figure 1:
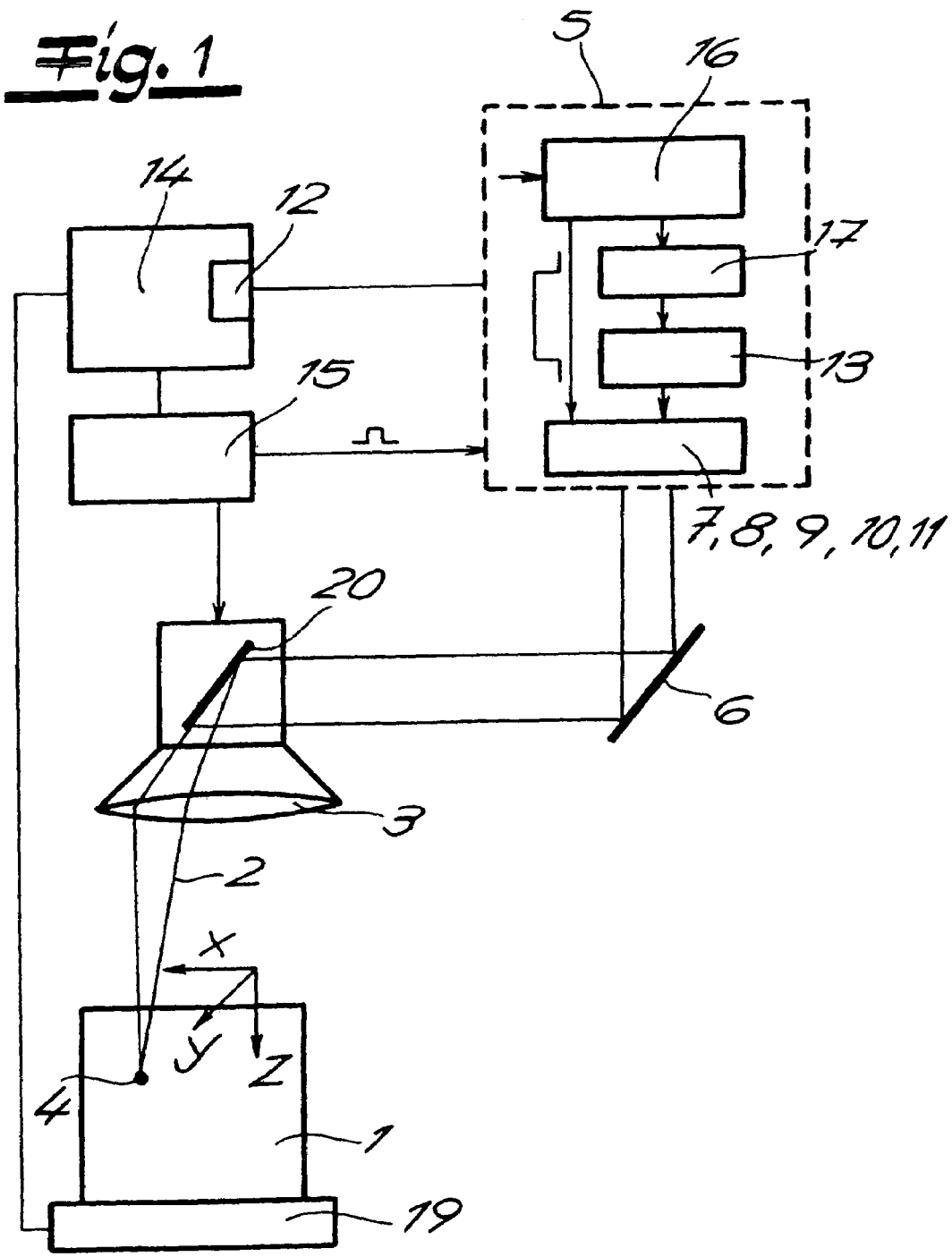

Referring now in detail to the drawings, there is shown a device for producing or inscribing subsurface markings in a transparent material body 1. This is achieved by focusing a pulsed laser beam 2 in the interior of material body 1 with the aid of an optical unit 3, 20 in such a way that pulsed laser beam 2 exceeds the destruction threshold of material body 1 at least in the respective focal point and a permanent marking 4 is produced. Localized fusion of the material with crack formation, which usually is macroscopically visible from outside in the form of "bubbles," takes place due to the interaction between pulsed laser beam 2 and the material of material body 1 in the region of the respective focal point or, in general terms, in the region of a corresponding beam waist.

The respective marking 4 produced in material body 1 consists of a spherical inhomogeneity or bubble. In this case, radius r of a corresponding bubble or marking 4 (see FIG. 3) depends on the pulse energy or laser pulse energy P of the respective laser pulse. The device described in greater detail below actually generates respective laser monopulses, i.e., selected individual pulses, with varying pulse energies P. Radius r of marking 4 increases proportionally to the pulse energy P. This can be ascertained particularly well based on the time-dependency diagram shown in FIG. 3, in the lower portion of which the pulse energies P of individual laser monopulses are plotted in the form of bars for different situations. This figure also shows the markings 4 with different radii r resulting thereof. Naturally, the individual processes are merely illustrated in a highly schematic fashion in FIG. 3 and not exactly true-to-scale.

The device for producing the subsurface markings generally comprises a laser 5 that delivers pulsed laser beam 2 on its output side, wherein the pulsed laser beam is reflected by means of a mirror 6 such that it is incident into the optical unit 3, 20. Laser 5 may optionally consist of a Q-switched, diode-pumped solid-state laser.

Figure 2:
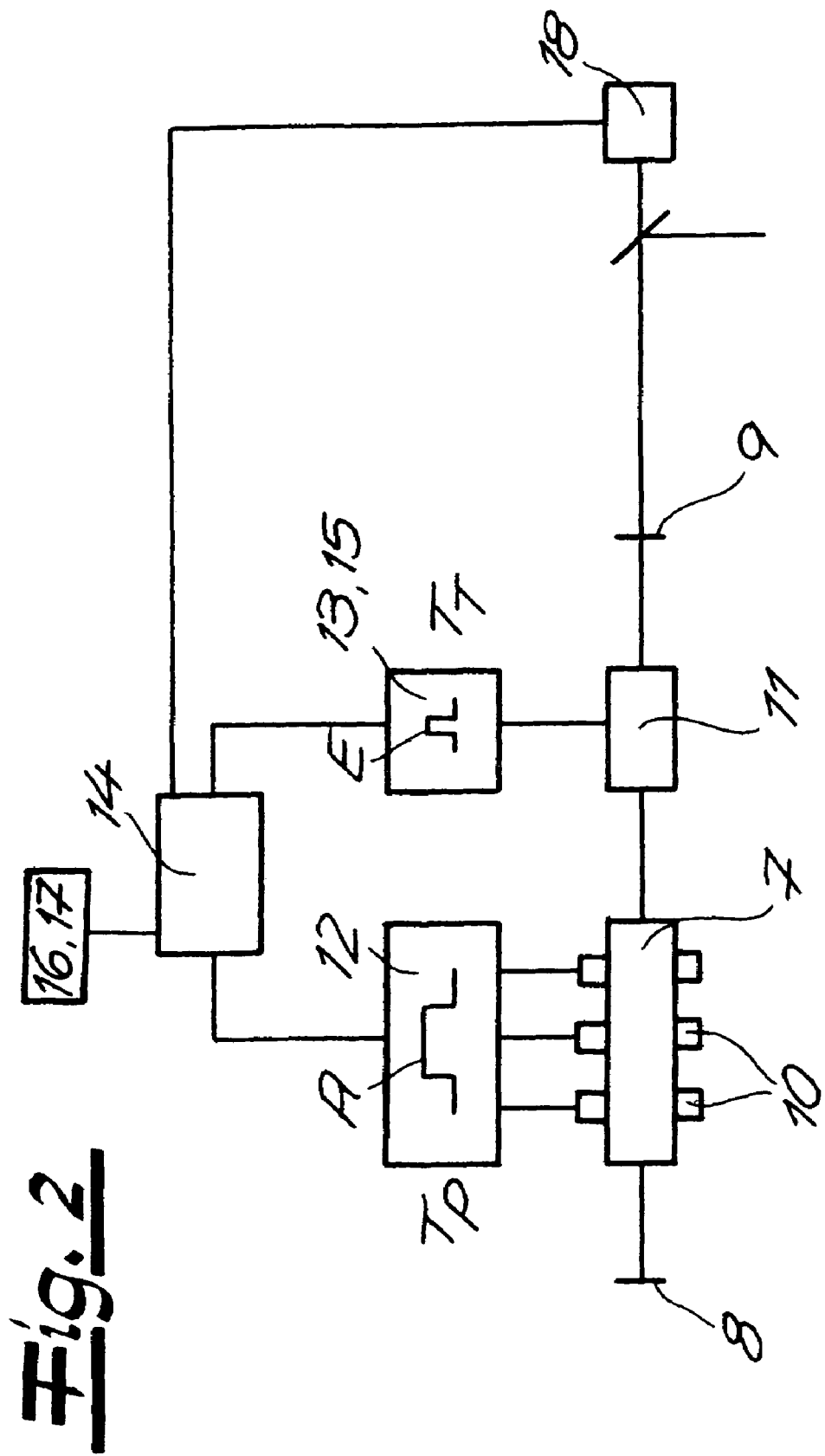
Figure 5:
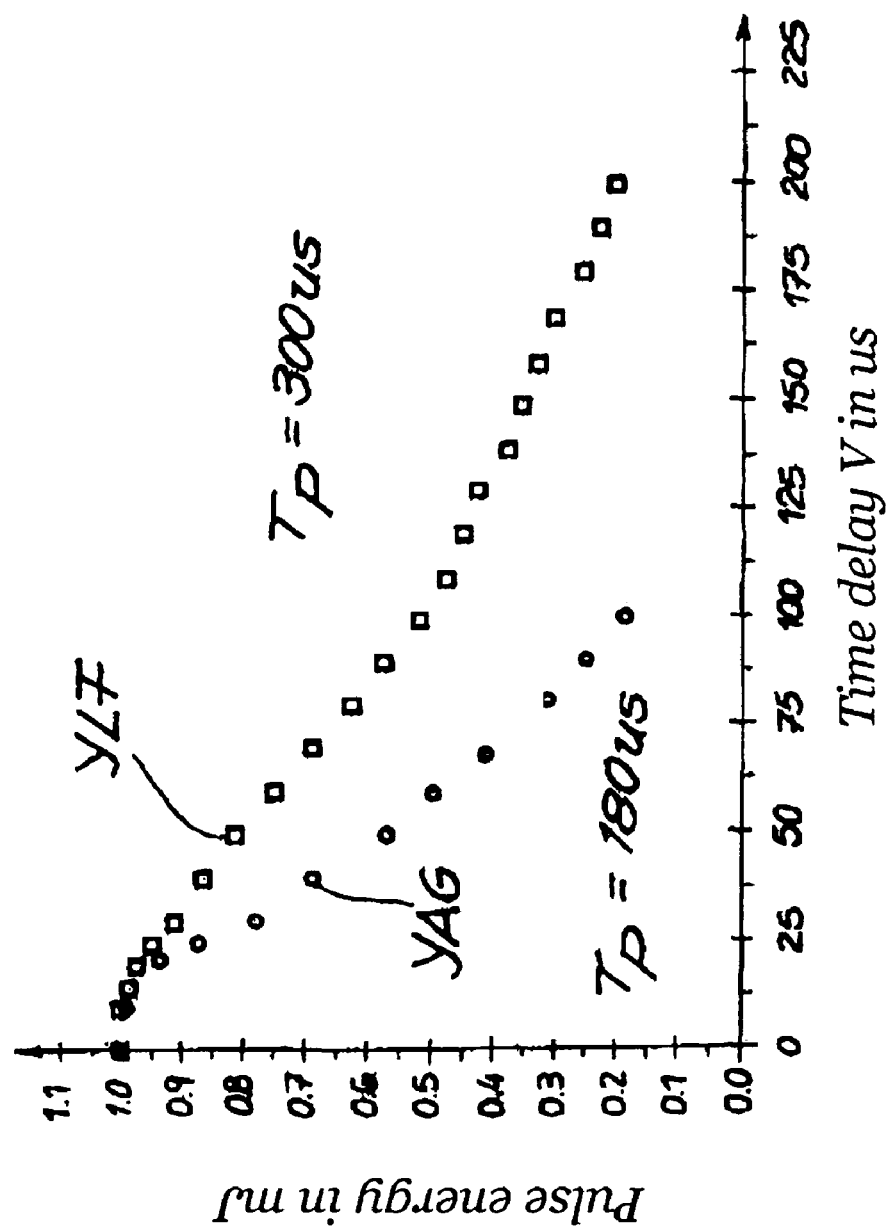

The laser material used actually consists of a laser rod 7 according to FIG. 2 that is situated within a laser resonator 8, 9. The laser resonator is conventionally composed, in essence, of two cavity mirrors 8, 9, wherein an output mirror in the form of cavity mirror 9 partially transmits laser beam 2 generated in the interior. Laser rod 7 may be optionally manufactured of the crystal neodymium-yttrium-aluminum-garnet (Nd:YAG). It is also possible to utilize Nd:YLF (neodymium-yttrium-lithium-fluoride) as shown in FIG. 5.

Individual diodes or semiconductor diodes 10 that are respectively indicated in the figures are used for optically pumping laser rod 7. These diodes realize the population inversion required for the lasing process in laser rod 7 and consequently the laser material. For this purpose, diodes 10 are acted upon with an excitation pulse A that has a pulse duration $T_P$ on the order of a few microseconds, typically below 10 microseconds. With respect to the pulse duration $T_P$ of the excitation pulse A, it needs to be observed that this pulse duration is shorter than the lifetime S of the upper laser level ($^4F_{3/2}$ with Nd:YAG). The lifetime S of the upper laser level actually amounts to several 100 microseconds in this case such that the requirement $$T_P < S$$

can be easily fulfilled under the conditions specified above.

The period $T_D$, i.e., the interpulse period between individual excitation pulses A, is chosen such that it exceeds twice the lifetime S. This is illustrated in the upper portion of the time-dependency diagram according to FIG. 3.

Naturally, the period $T_D$ may also amount to three-times or four-times the lifetime S. In this respect, it is decisive that the upper laser level is almost completely depopulated before the beginning of the next excitation pulse A, i.e., the population inversion built up by the excitation pulse A as a prerequisite for the lasing process is largely no longer present. Actually, the population density N of the upper laser level approximately follows the progression illustrated on the very top in FIG. 3. One can ascertain that the population density N of the respective laser level drops about exponentially—following the falling edge of the excitation pulse A. The increase in the population density N and of the excitation pulse A, in contrast, extends in a nearly synchronous fashion.

The respective laser pulse being emitted by the laser 5 can be varied with respect to its pulse energy P by means of a discharge pulse E that has an adjustable time delay referred to the excitation pulse A. Consequently, markings 4 that respectively have varying optical properties can be produced depending on the pulse energy P. The varying pulse energies P actually correspond to the bubbles with different radii r that were already described above and are illustrated in the lower portion of the time-dependency diagram according to FIG. 3.

Figure 3:
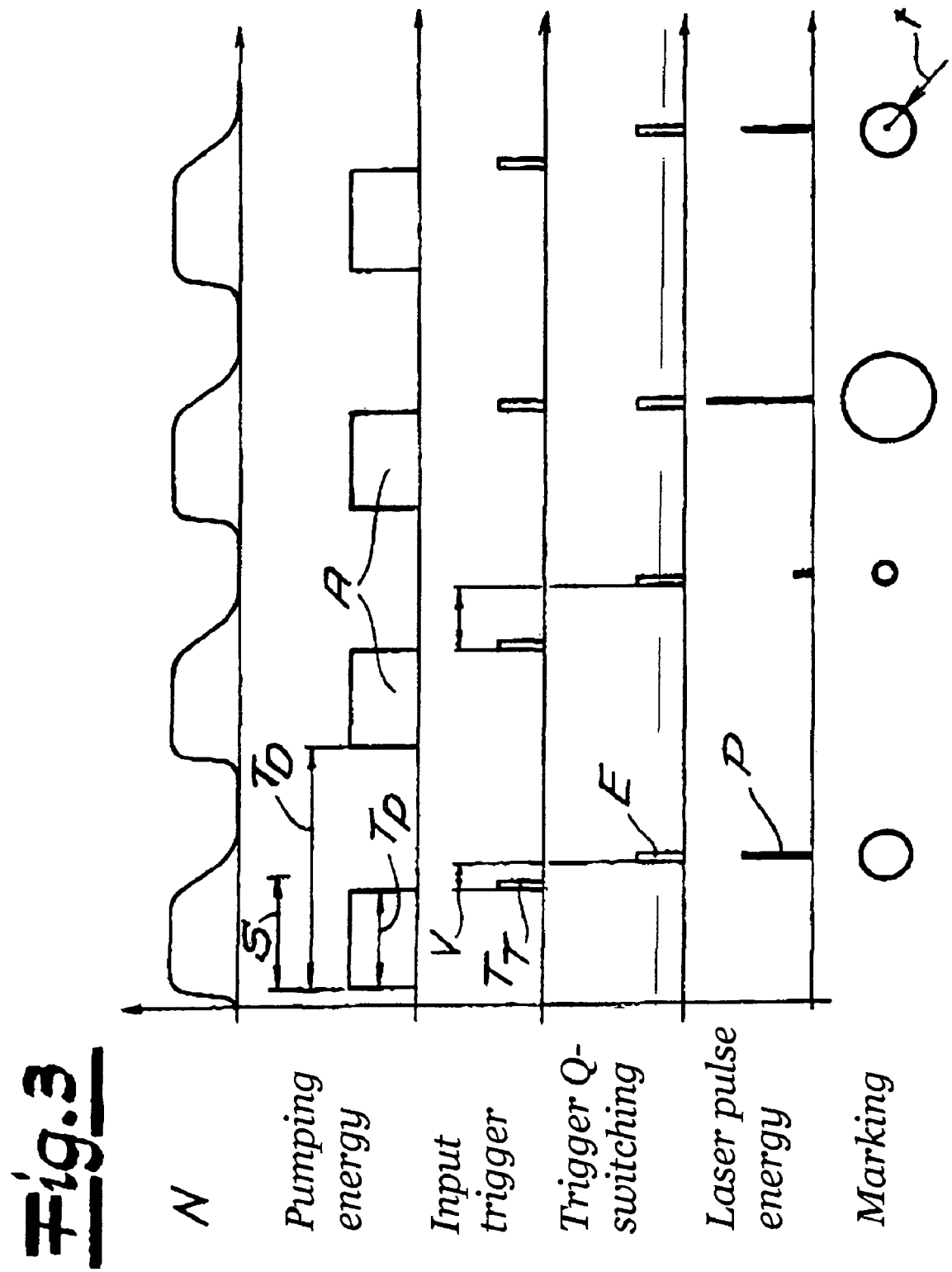

Between the excitation pulse A and the discharge pulse E, a time delay V is adjusted that lies between the falling edge of the excitation pulse A and the rising edge of the discharge pulse E (see FIG. 3, center). Said time delay V may lie between 0 and 200 microseconds such that the discharge pulse E ultimately coincides with the (exponentially falling) edge of the population density N of the upper laser level (in this respect, see also FIG. 5). The number of electrons of the upper laser level that participate in this lasing process in accordance with the population density N depends on the time at which the discharge pulse E discharges the energy in the laser rod 7 such that a laser pulse is emitted by the laser resonator 8, 9. FIG. 3 clearly shows that the pulse energy P varies as a result thereof.

The discharge pulse E for varying the pulse energy is generated, in particular, with the aid of a Q-switch 11 in laser resonator 8, 9. Q-switch 11 consists of an active light switch that acts acousto-optically or electro-optically and functions as a modulator for the resonator losses. The Q-switch 11 is in the form of a Pockels cell 11 in the embodiment shown. Such a Pockels cell 11 serves for the individual pulse selection of the laser radiation that follows the respective excitation pulse A. In other words, individual pulses or so-called laser monopulses are generated on the output side of the laser 5 with the aid of Q-switch 11.

In this case, the Q-switch or Pockels cell 11 utilizes the so-called Pockels-effect or Kerr-effect that is based on the field-induced double refraction in crystals and liquids, respectively. In other words, the polarizing direction of the incident light can be changed and selected with the aid of an analyzer in a Pockels cell 11 by means of an electric field. When no voltage is applied to Pockels cell 11, it is optically isotropic and the thusly realized electro-optical switch transmits no light. However, the material is double-refractive and cannot be completely blocked by the analyzer when a field is applied.

In any case, the Pockels cell or Q-switch 11 within laser resonator 8, 9 acts like an extremely fast optical switch and only allows a laser pulse to be generated on the output side when a voltage is applied or when acted upon by a discharge pulse E with the duration $T_T$. In other words, the energy stored in laser rod 7 can only be emitted by laser resonator 8, 9 in the form of a laser pulse with pulse energy P when Pockels cell 11 is open.

Discharge pulse E with duration $T_T$ is generated in a computer unit 14. Actually, the falling edge of the excitation pulse A defines an input trigger pulse with the duration $T_T$ that, after the time delay V, opens Pockels cell 11 for the duration $T_T$ in the form of a discharge pulse E.

The Q-switch 11 or Pockels cell therefore is acted upon by the discharge pulse E, namely within the pulse duration $T_T$. Since the time delay V lies between the excitation pulse A and the discharge pulse E, the lasing process takes place—depending on the time delay V—at times when the population density N of the upper laser level has already more or less decreased. This makes it possible to vary the pulse energy P of the laser monopulse on the output side—as described above. In this case, the excitation pulse A for realizing the population inversion in the laser material or laser rod 7, respectively, is used as a starting pulse for the adjustable time delay V until the beginning of the discharge pulse E. Actually, this is realized with the falling edge of the excitation pulse A.

Diodes 10 for optically pumping laser rod 7 are acted upon by a control unit 12. The Q-switch or Pockels cell 11, in contrast, receives its required switching energy from another control unit 13. Both control units 12, 13 are controlled by a computer unit 14. Computer unit 14, in turn, acts upon a trigger pulse generator 15 that defines pulse duration $T_T$ of discharge pulse E.

An energy supply 16, 17 is also realized. The computer unit 14 as well as trigger pulse generator 15 and control units 12, 13 may be combined into a control system 12, 13, 14, 15. This control system may also include energy supply unit 16, 17 that, however, is illustrated as part of laser 5 in the figures (see FIGS. 1 and 2).

The pulse energy P of the individual laser monopulses can be determined with a power meter 18. If power meter 18 is connected to control system 12, 13, 14, 15 or computer unit 14, respectively, the pulse energy P can be controlled in accordance with certain specifications in this fashion. It is well known that the pulse energy P actually depends on the time delay V between the excitation pulse A and the discharge pulse E. Depending on the pulse energy P measured by means of the energy meter or power meter 18, the time delay V can be varied by computer unit 14 or control system 12, 13, 14, 15, respectively, until pulse energy P corresponds to the specifications or follows a program stored in computer unit 14. Naturally, these procedures may precede the actual marking process such that the entire system can be quasi calibrated in this fashion. In other words, the corresponding pulse energy P for each time delay V is stored in a memory of computer unit 14, retrieved on demand and converted into a marking 4 of the desired size or with the desired radius r, respectively.

In order to produce markings 4 in different positions in space within material body 1, material body 1 is accommodated by a positioning unit 19 that can be moved in the X-direction, the Y-direction and the Z-direction. Positioning unit 19 is connected to computer unit 14 and follows a program stored therein. In addition, optical unit 3, 20 comprises a so-called F-Teta lens 20 that compensates possible changes of the beam waist due to an aberration of the entire optical path—under the control of computer unit 14.

Figure 4:
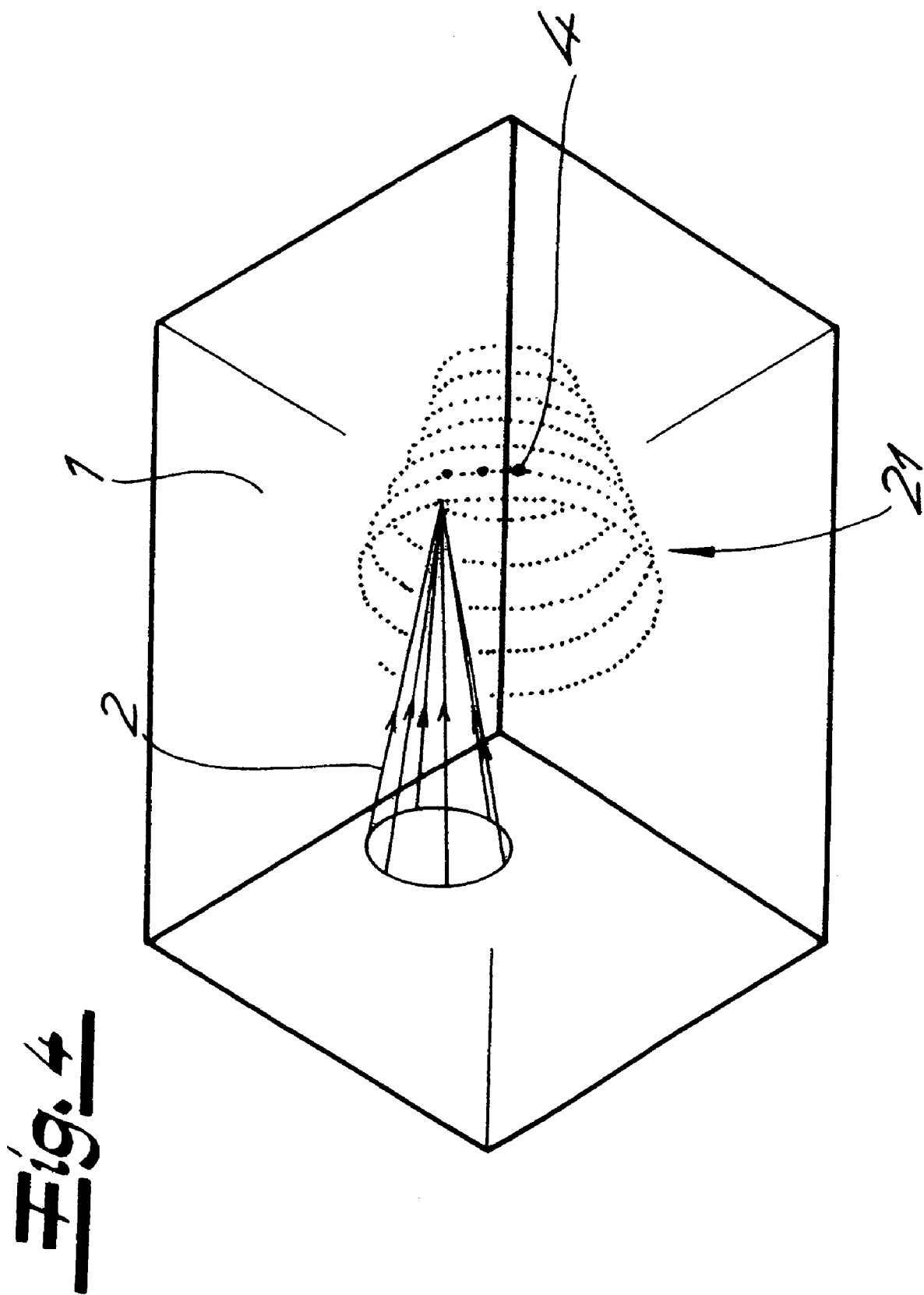

Markings 4 can be three-dimensionally inscribed into material body 1, if applicable, with different radii r by controlling positioning unit 19 accordingly with the aid of computer unit 14. This ultimately results in an internal engraving 21 (see FIG. 4) with markings 4 of varying sizes. The overall output wavelength of the laser amounts to 532 nm at a half-width of the pulses of approximately 7 ns. The maximum pulse energy P lies at approximately 1 mJ at a repetition rate on the order of 1-3 kHz.

According to FIG. 5, the pulse energy P in a laser rod 7 of Nd:YLF (boxes) has the tendency to decrease less than in a laser rod 7 of Nd:YAG (circles) as the time delay V increases. The respectively different duration $T_P$ of excitation pulse A ($T_P$=300 microseconds for Nd:YLF and $T_P$=180 microseconds for Nd:YAG, respectively) takes into account the varying lifetimes S of the respective upper laser level.

Accordingly, while only a few embodiments of the present invention have been shown and described, it is obvious that many changes and modifications may be made thereunto without departing from the spirit and scope of the invention.

What is claimed is:

1. A method for producing subsurface markings in a transparent material body comprising the following steps:

applying excitation pulses to an optical pump source for a laser material, in order to produce population inversion in the laser material;

focusing a pulsed laser beam in the interior of the material body in such a way that the laser beam exceeds a destruction threshold of the material body at least in a respective focal point to produce a permanent marking; and creating a relative movement between the laser beam and the material body to create individual markings that form a freely selectable internal engraving;

wherein a pulse energy (P) of a laser pulse from the laser beam is varied by means of a discharge pulse (E) using a Q-switch selected from the group consisting of an active light switch, an acousto-optical modulator and an electro-optical modulator, said discharge pulse having an adjustable time delay from an excitation pulse (A) such that markings with different optical properties are produced in dependence on the pulse energy (P); and wherein a falling edge of the excitation pulse (A) is utilized as a starting pulse for the adjustable delay time up to a beginning of the discharge pulse.

2. The method according to claim 1, wherein individual laser monopulses are generated with a pulse energy (P) that is defined by the time delay (V).

3. The method according to claim 1, wherein the marking produced in the material body corresponds to a spherical inhomogeneity, a radius r of which varies in dependence on the pulse energy (P).

4. A device for producing subsurface markings in a transparent material body comprising:
- a pulsed laser;
- optical unit that is adapted to focus a pulsed laser beam from the pulsed laser on an interior of the material body in such a way that the laser beam exceeds a destruction threshold of the material body at least in a respective focal point to produce a permanent marking; wherein individual markings form a freely selectable internal engraving as a result of a relative movement between the laser beam and the material body;
- an optical pump source for a laser material of the laser, said pump source having excitation pulses applied to it to produce population inversion in the laser material; and
- a laser resonator having an optical Q-switch in the form of an active light switch within the laser resonator, said switch defining a discharge pulse (E) that modulates optical losses in the laser resonator, said discharge pulse having an adjustable time delay from an excitation pulse (A) such that laser pulses with varying and predetermined pulse energies (P) are emitted by the laser resonator in order to respectively produce markings with varying optical properties in the material body depending on the pulse energy (P); and wherein a falling edge of the excitation pulse is utilized as a starting pulse for the adjustable delay time up to a beginning of the discharge pulse (E).

\* \* \* \* \*